US012698711B2

(12) United States Patent
Gartner et al.

(10) Patent No.: US 12,698,711 B2
(45) Date of Patent: Aug. 4, 2026

(54) METHOD OF OPERATING A MINING HOIST

(71) Applicant: ABB Schweiz AG, Baden (CH)

(72) Inventors: Tim Gartner, Dollard des Ormeaux (CA); Jerzy Katolik, Saint-Lazare (CA)

(73) Assignee: ABB Schweiz AG, Baden (CH)

( * ) Notice: Subject to any disclaimer, the term of this patent is extended or adjusted under 35 U.S.C. 154(b) by 905 days.

(21) Appl. No.: 18/079,321

(22) Filed: Dec. 12, 2022

(65) Prior Publication Data

US 2023/0107923 A1 Apr. 6, 2023

Related U.S. Application Data

(63) Continuation of application No. PCT/IB2021/055071, filed on Jun. 9, 2021.

(30) Foreign Application Priority Data

Jun. 10, 2020 (EP) .................................... 20179280

(51) Int. Cl.

*E21F 13/00* (2006.01)
*B66B 1/10* (2006.01)
*B66B 19/00* (2006.01)

(52) U.S. Cl.

CPC ................ *E21F 13/00* (2013.01); *B66B 1/10* (2013.01); *B66B 19/00* (2013.01)

(58) Field of Classification Search

None
See application file for complete search history.

(56) References Cited

FOREIGN PATENT DOCUMENTS

| | | | |
|---|---|---|---|
| CN | 102009887 | A | 4/2011 |
| CN | 107601244 | A | 1/2018 |
| EP | 3045415 | A1 | 7/2016 |

OTHER PUBLICATIONS

European Patent Office, Extended European Search Report in European Patent Application No. 20179280.1, 8 pp. (Jan. 18, 2021).
European Patent Office, International Search Report in International Patent Application No. PCT/IB2021/055071, 4 pp. (Sep. 20, 2021).
European Patent Office, Written Opinion in International Patent Application No. PCT/IB2021/055071, 6 pp. (Sep. 20, 2021).

*Primary Examiner* — Michelle M Iacoletti
(74) *Attorney, Agent, or Firm* — Fitch Even Tabin & Flannery LLP

(57) ABSTRACT

An underground mine hoist and method of operating the mine hoist is provided. Unlike conventional underground mine hoists, the hoist may be operated at a production rate less than the designed maximum production rate at least part of the time to improve the life of the hoist and efficiency of operation. In order to vary the hoist production rate, an input rate and/or output rate of mined material is monitored, and the hoist production rate is varied based on such monitoring.

20 Claims, 2 Drawing Sheets

METHOD OF OPERATING A MINING HOIST

CROSS-REFERENCE TO RELATED APPLICATIONS

This patent application claims priority to International Patent Application No. PCT/IB2021/055071, filed on Jun. 9, 2021, and to European Patent Application No. EP20179280.1, filed on Jun. 10, 2020, each of which is incorporated herein in its entirety by reference.

FIELD OF THE DISCLOSURE

The present disclosure relates to underground mining equipment and, more particularly, to an underground mine hoist that raises mined material to the surface.

BACKGROUND OF THE INVENTION

Mine production hoists are typically designed for certain defined ore production rates based on a number of hoist operational parameters, some of which include ore payload, hoist rope speed, motor cyclic acceleration rates and deceleration rates and others (collectively called duty cycle parameters). These defined operational parameters are used in the mine hoist mechanical design process to further define specific mechanical features of the hoist design, including for example, the thickness of the steel used in the hoist, the diameter of the hoist shafts, the type of welds and the strength of bolts used to build the hoist, etc.

Assuming normal care and maintenance of the hoist over its lifetime, it is expected that the mine hoist will reach its designed life before major maintenance or replacement is needed when the hoist is operated within the defined duty cycle parameters. If, however, the hoist is operated with duty cycle parameters outside of the defined design parameters, it is likely that the life of the hoist will be altered. For example, if the mine hoist is operated with duty cycle parameters above the original design parameters, it is expected that the mine hoist lifetime will be lower than original design expectations. However, if the mine hoist is operated with duty cycle parameters below the original design parameters, it is possible that the life of the hoist may be increased.

Typically, the duty cycle parameters used to operate the mine hoist are fixed by various inter-connected control systems (e.g., the hoist control system, the hoist drive system and the loading pocket control system, collectively referred to as a controller or control system). The interconnected control systems ensure that the hoist operates with the original design duty cycle parameters with the intent that the mine hoist will achieve the expected life before major maintenance or replacement.

BRIEF SUMMARY OF THE INVENTION

The present disclosure describes embodiments for a method of improving the efficiency and life of the mine hoist. In the mine hoist system, the input rate and/or output rate of mined material is monitored. Operation of the mine hoist is then varied based on the input rate and/or output rate. As a result, the mine hoist may be operated at a production rate less than the designed production rate at least part of the time.

BRIEF DESCRIPTION OF THE SEVERAL VIEWS OF THE DRAWING(S)

DETAILED DESCRIPTION OF THE INVENTION

Figure 1:
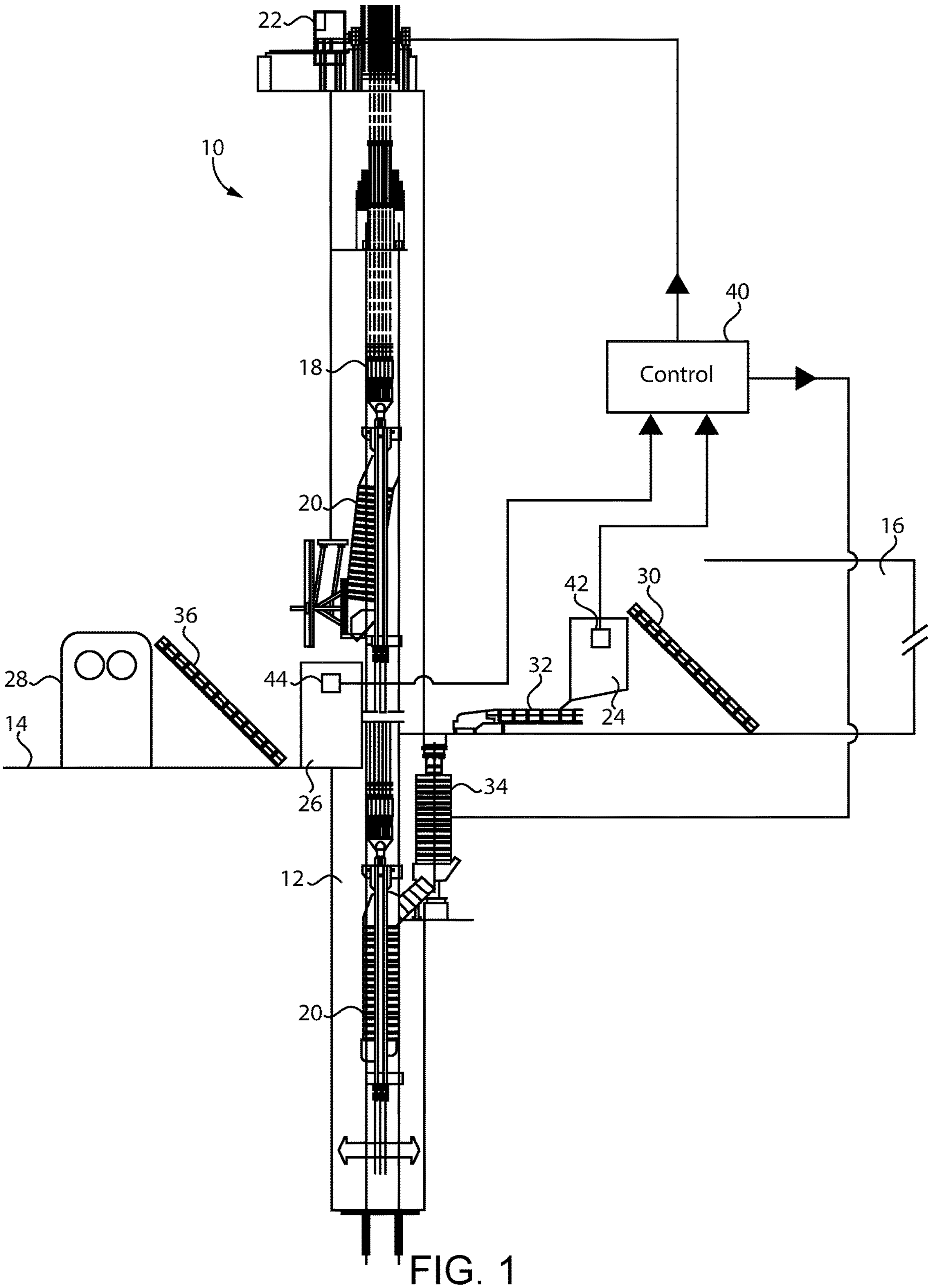
FIG. 1 is a schematic view of an underground mining system in accordance with the disclosure.

Ore production hoists, through their various interconnected control systems, ensure the system operates at fixed duty cycle parameters, as originally designed, to ensure that the mine hoist provides the originally intended ore production rate while also achieving the expected design lifetime of the hoist. In many cases, however, it may be desirable to operate a mine hoist at a production rate that is different from the original design. For example, variations in the underground mining rate and the aboveground milling rate may influence the necessary production rate of the mine hoist. The underground input rate and the aboveground output rate of the mine hoist can vary based on many factors, including work schedules, equipment failures and maintenance, ore market demand, etc. For example, if ore market demand reduces, resulting in a lower ore production requirement from a mine hoist, it is possible that the mine hoist life may be extended by operating the mine hoist below its design duty cycle parameters. Conversely, if ore market demand increases, requiring a higher ore production from the mine hoist, the mine hoist could be operated above its original design duty cycle parameters, which will likely result in a lower expected lifetime.

The mine hoist duty cycle parameters that the mine hoist is operated with are typically fixed by various control systems (interconnected hoist control system, hoist drive system and loading pocket control system, collectively referred to as a controller). It is not easy or normal in conventional systems to automatically and dynamically change the duty cycle parameters to match ore production requirements. Mine hoist speed, acceleration rates and deceleration rates are normally fixed within the mine hoist control system. The mine hoist payload is normally fixed within the hoist container loading system. These fixed values are set during mine hoist commissioning and are neither easy to change or desired to change in conventional systems.

In the preferred mine hoist system described below, the system may be used to automatically and dynamically change and adjust mine hoist duty cycle parameters to allow a mine hoist to operate more efficiently according to changes in the underground input rate fed to the mine hoist and the aboveground output rate supplied by the mine hoist. This may allow the mine hoist life to be increased by operating the mine hoist below one or more of the designed duty cycle parameters while still satisfying the underground input rate and the aboveground output rate.

A system of automatically and dynamically changing and adjusting mine hoist duty cycle parameters may provide a number of advantages. For example, production hoist life may be extended by allowing the hoist to operate at lower ore production rates when the designed ore production rate is not needed. This may occur, for example, when ore market demand is low. By extending production hoist life when possible, the negative effects on production hoist life when ore market demand is high may be offset. Automatically and dynamically adjusting ore production rates may also be used to match downstream processing mill throughput rates. Electrical costs may also be reduced, particularly in regards to reducing peak demand current which occurs at the end of each mine hoist acceleration cycle.

Mine hoist operating duty cycle parameters reside within the interconnected hoist control system, hoist drive system and payload control system are typically fixed during the commissioning stage. As a result, it is not easy to change the operating parameters. For example, the hoist payload is normally fixed by the loading pocket control system. It is normally not changed when operating the mine hoist. That is, when the necessary production rate is less than the original design production rate, the hoist will operate at the original design rate but for a shorter period of time. If a higher production rate is needed, the hoist will operate for longer periods which potentially reduces the time available to perform daily maintenance.

In one preferred embodiment described herein, the control system may receive real-time operational parameters from the upstream and downstream ore flow system. Examples of such possible parameters include the downstream mill throughput rate, downstream surface bin storage level, upstream underground bin storage level, upstream mining rate, or hoist power consumption. The control system may then analyze the operational parameters and determine optimal duty cycle parameters to reduce the production rate of the mine hoist and potentially reduce mechanical stresses and power consumption (i.e., peak or RMS). Possible duty cycle parameters that may be adjusted include hoist container payload, hoist speed, and drive motor acceleration and/or deceleration rates. The control system may forward the adjusted duty cycle parameters to various interconnected control systems, such as a hoist container loading conveyor control system (payload control), hoist control system or hoist drive system.

Turning to FIG. 1, an example of an underground mine production hoist system 10 is shown. The system 10 includes an underground shaft 12 that extends from a surface 14 of the earth to a mining area 16 under the surface 14. In FIG. 1, the surface 14, mining area 16 and shaft 12 are shown condensed for illustration; however, it is understood that the shaft 12 may be 1,000 to 10,000 feet in length such that there is a significant distance between the surface 14 and the mining area 16. It is also understood where the surface 14 of the earth is referred to herein that such surface 14 may be any surface 14 above the underground mining area 16 to which mined material is raised for further processing. Thus, the surface 14 may technically be underground, in a hole or some other location which is at a higher location from the mining area 16 to which mined material is raised. A drive mechanism 18, such as ropes and pulleys, extends through the underground shaft 12 and is connected to one or more hoist containers 20 (sometimes referred to as skips or ore conveyances). A motor 22, which is typically located at the top of the drive mechanism 18, drives the mechanism 18 to raise and lower the hoist container 20 within the shaft 12 between the mining area 16 and the surface 14.

The system 10 may also include an underground storage bin 24 near the mining area 16 and an aboveground storage bin 26 near a mill 28. Thus, during mining operations, mined material is collected from the mining area 16 and filled in the underground storage bin 24, for example, with a conveyor 30. The mined material is then loaded into the hoist container 20, for example, with a conveyor 32 and loader 34. Once the hoist container 20 is filled, the motor 22 and drive mechanism 18 raises the hoist container 20 to the surface 14 where the hoist container 20 is emptied into the aboveground storage bin 26. The mined material is then removed from the aboveground storage bin 26, for example, with a conveyor 36. The material is then typically processed, for example, with a roller mill 28.

In the preferred system, a controller 40 is provided to control the production rate of the hoist 10 (i.e., the rate of mined material that is filled, raised and emptied from the hoist container 20). Further, a sensor 42, 44 may be provided in the underground storage bin 24 and/or the aboveground storage bin 26 to measure the level of mined material therein. The controller 40 may then use the sensor data to determine the underground input rate (e.g., the rate at which the underground storage bin 24 is being filled or emptied) and the aboveground output rate (e.g., the rate at which the aboveground storage bin 26 is being filled or emptied). It is also possible for the underground input rate or mining rate to be determined from other sensors monitoring mining activity and for the aboveground output rate or milling rate to be determined from other sensors monitoring milling activity. Based on the underground input rate and/or the aboveground output rate, the controller 40 then varies the production rate of the hoist 10. For example, the production rate may be varied by varying the payload of the mined material that is loaded into the hoist container 20. That is, instead of always fully loading the hoist container 20 to 100% capacity, the hoist container 20 may only be filled 90%, 80%, 70%, etc. before raising and emptying the hoist container 20. It is also possible to adjust the production rate of the hoist 10 by changing the acceleration and deceleration of the hoist container 20 (e.g., by controlling the motor 22).

Figure 2:
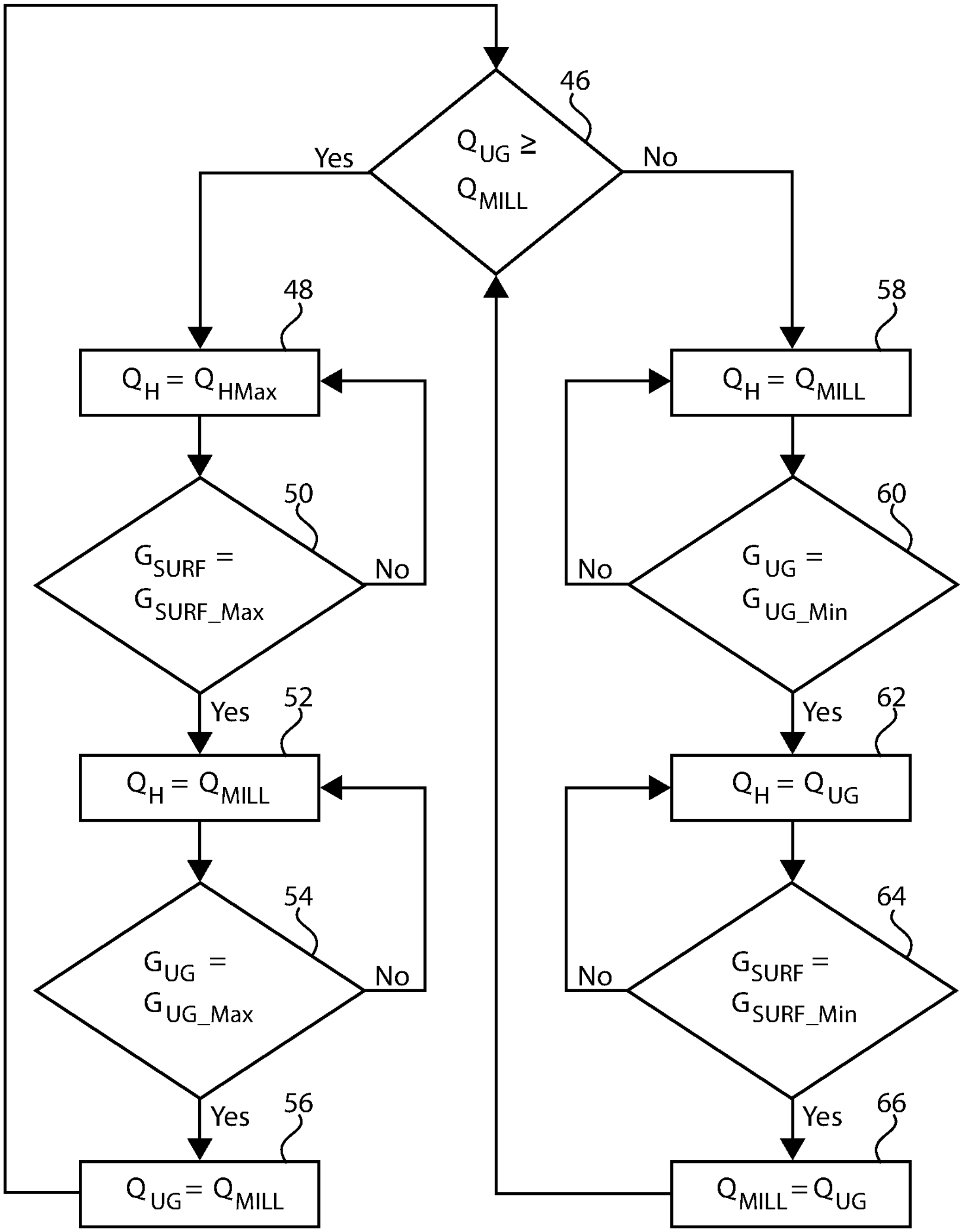
FIG. 2 is a flowchart of a method of operating an underground mine hoist in accordance with the disclosure.

An example of a control algorithm that the controller 40 may use to vary the production rate of the hoist 10 is shown in FIG. 2. In the flowchart, $Q_{UG}$ refers to the underground input rate (e.g., the mining rate and/or rate of filling the underground storage bin 24), $Q_{MILL}$ refers to the aboveground output rate (e.g., the milling rate and/or rate of emptying the aboveground storage bin 26), $Q_H$ refers to the production rate of the hoist 10 (e.g., payload of the hoist container 20 or acceleration/deceleration of the hoist container 20), $G_{SURF}$ refers to the fill level of the aboveground storage bin 26, and $G_{UG}$ refers to the fill level of the underground storage bin 24.

In one step of controlling the hoist 10, the underground input rate $Q_{UG}$ is compared to the aboveground output rate $Q_{MILL}$ (46). If the underground input rate $Q_{UG}$ is greater than or equal to the aboveground output rate $Q_{MILL}$, the controller 40 switches to a storage bin filling branch of the method where the production rate $Q_H$ is initially set to the maximum hoist production rate $Q_{HMax}$ (or at least a production rate $Q_H$ greater than the aboveground output rate $Q_{MILL}$) (48). On the other hand, if the underground input rate $Q_{UG}$ is less than the aboveground output rate $Q_{MILL}$, the controller 40 switches to a storage bin emptying branch of the method where the production rate $Q_H$ is initially set to the aboveground output rate $Q_{MILL}$ (58). It is also possible in this stage for the production rate $Q_H$ to be less than the maximum production rate $Q_{HMax}$ and greater than the underground input rate $Q_{UG}$ (58). In the storage bin filling branch of the method, the production rate $Q_H$ of the hoist 10 remains greater than the aboveground output rate $Q_{MILL}$ (or remains set at $Q_{HMax}$) until the fill level $G_{SURF}$ of the aboveground storage bin 26 reaches the capacity $G_{SURF\_Max}$ of the storage bin 26 (50). Then, the production rate $Q_H$ of the hoist 10 is set to the aboveground output rate $Q_{MILL}$ (52).

It is also possible in this stage for the hoist production rate $Q_H$ to be less than the underground input rate $Q_{UG}$ (52). The production rate $Q_H$ of the hoist 10 remains at this rate until the fill level $G_{UG}$ of the underground storage bin 24 reaches the capacity $G_{UG\_Max}$ of the storage bin 24 (54). At this point, both storage bins 24, 26 are full which means that the underground input rate $Q_{UG}$ must slow to the aboveground output rate $Q_{MILL}$ (or alternatively mining activity may cease) (56). The production rate $Q_H$ of the hoist 10 will remain set at the aboveground output rate $Q_{MILL}$ so long as mined material is being removed from the aboveground storage bin 26. It is understood that while the flowchart shows the underground input rate $Q_{UG}$ and the aboveground output rate $Q_{MILL}$ being compared again after completion of the filling and emptying branches that such retesting need not wait until completion of the respective branch but may also be done repeatedly during a branch sequence.

In the emptying branch, the production rate $Q_H$ of the hoist 10 remains set to the aboveground output rate $Q_{MILL}$ until the fill level $G_{UG}$ of the underground storage bin 24 reaches the bottom $G_{UG\_Min}$ of the storage bin 24 (60). Then, the production rate $Q_H$ of the hoist 10 is set to the underground input rate $Q_{UG}$ (62). It is also possible in this stage for the hoist production rate $Q_H$ to be less than the aboveground output rate $Q_{MILL}$ (62). The production rate $Q_H$ of the hoist 10 remains at this rate until the fill level $G_{SURF}$ of the aboveground storage bin 26 reaches the bottom $G_{SURF\_Min}$ of the storage bin 26 (64). At this point, both storage bins 24, 26 are empty which means that the aboveground output rate $Q_{MILL}$ must slow to the underground input rate $Q_{UG}$ (or alternatively the mill 28 may be stopped) (66). The production rate $Q_H$ of the hoist 10 will remain set at the underground input rate $Q_{UG}$ so long as mined material is being filled into the underground storage bin 24.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating an underground mine hoist, comprising:

monitoring, by a sensor, an underground input rate and/or an aboveground output rate of mined material;

filling a hoist container underground with the mined material, the hoist container connected to a drive mechanism extending in an underground shaft from a surface of the earth to a mining area under the surface;

operating a motor operably coupled to the drive mechanism to raise the hoist container in the underground shaft toward the surface of the earth;

emptying the mined material from the hoist container; and varying, by a controller operably coupled to the sensor, a rate of the mined material filled, raised and emptied with the hoist container in response to a signal of the sensor indicative of the underground input rate and/or the aboveground output rate.

2. The method according to claim 1, wherein the underground input rate is a mining rate and the aboveground output rate is a milling rate.

3. The method according to claim 1, wherein the rate of mined material filled, raised and emptied is varied by varying a payload of the mined material filled in the hoist container.

4. The method according to claim 1, wherein the rate of mined material filled, raised and emptied is varied by varying an acceleration or deceleration of the hoist container when the hoist container is raised.

5. The method according to claim 1, wherein the underground input rate and the aboveground output rate of the mined material are monitored by the sensor.

6. The method according to claim 1, wherein the rate of the mined material filled, raised and emptied is less than the underground input rate of the mined material when the underground input rate is greater than the aboveground output rate.

7. The method according to claim 1, wherein the rate of the mined material filled, raised and emptied matches the aboveground output rate of the mined material when the underground input rate is greater than the aboveground output rate.

8. The method according to claim 1, wherein the rate of the mined material filled, raised and emptied is less than the aboveground output rate of the mined material when the aboveground output rate is greater than the underground input rate.

9. The method according to claim 1, wherein the rate of the mined material filled, raised and emptied matches the underground input rate of the mined material when the aboveground output rate is greater than the underground input rate.

10. The method according to claim 1, wherein the mined material is emptied from the hoist container into an aboveground storage bin, the aboveground output rate being a rate of removal of the mined material from the aboveground storage bin.

11. The method according to claim 10, wherein the rate of the mined material filled, raised and emptied is greater than the aboveground output rate when the underground input rate is greater than the aboveground output rate until the aboveground storage bin reaches a maximum fill.

12. The method according to claim 1, wherein the mined material is filled in the hoist container from an underground storage bin, the underground input rate being a rate of filling of the mined material into the underground storage bin.

13. The method according to claim 12, wherein the rate of the mined material filled, raised and emptied is less than a maximum rate of filling, raising and emptying the hoist container and greater than the underground input rate when the aboveground output rate is greater than the underground input rate until the underground storage bin reaches a minimum fill.

14. The method according to claim 1, wherein the mined material is filled in the hoist container from an underground storage bin, the underground input rate being a rate of filling of the mined material into the underground storage bin.

15. The method according to claim 14, wherein the rate of the mined material filled, raised and emptied matches the aboveground output rate when the aboveground output rate is greater than the underground input rate until the underground storage bin reaches a minimum fill.

16. The method according to claim 1, wherein the sensor includes a first sensor that monitors the underground input rate and provides a first signal indicative of the underground input rate, and the sensor includes a second sensor that monitors the aboveground output rate and provides a second signal indicative of the aboveground output rate.

17. The method according to claim 16, wherein the controller operates to vary and control the rate of the mined material filled, raised and emptied in response to the first and second signals.

18. The method according to claim 1, wherein the rate of the mined material filled, raised and emptied is less than a maximum rate of filling, raising and emptying the hoist container when the underground input rate or the aboveground output rate of mined material is less than the maximum rate of filling, raising and emptying the hoist container.

19. An underground mine hoist, comprising:

an underground shaft extending from a surface of the earth to a mining area under the surface;

a drive mechanism extending within the underground shaft;

a hoist container connected to the drive mechanism;

a motor operable to drive the drive mechanism to raise and lower the hoist container within the underground shaft between the mining area and the surface of the earth;

a sensor to monitor an underground input rate and/or an aboveground output rate of mined material, the sensor providing a sensor signal; and a controller configured to vary a rate of the mined material filled, raised and emptied with the hoist container in response to the sensor signal, which sensor signal is indicative of the underground input rate and/or the aboveground output rate.

20. The underground mine hoist of claim 19, further comprising:

an underground storage bin adapted to receive material at the underground input rate and to supply material to the hoist container; and an aboveground storage bin adapted to receive material from the hoist container and disburse mined material at the aboveground output rate.

* * * * *